United States Patent [19]

Schneider

[11] 4,338,092
[45] Jul. 6, 1982

[54] DISAZO COMPOUNDS HAVING A 4,6,8-TRISULFONAPHTHYL DIAZO COMPONENTS RADICAL AND A 2-AMINO OR SUBSTITUTED AMINO-4-CHLORO-1,3,5-TRIAZIN-6-YL-AMINO SUBSTITUENT

[75] Inventor: Lukas Schneider, Basel, Switzerland

[73] Assignee: Sandoz Ltd., Basel, Switzerland

[21] Appl. No.: 217,530

[22] Filed: Dec. 17, 1980

[30] Foreign Application Priority Data

Dec. 21, 1979 [CH] Switzerland .................. 11411/79

[51] Int. Cl.³ .............................................. C09B 62/00
[52] U.S. Cl. ........................................ 8/549; 8/437;
8/681; 8/687; 8/688; 8/917; 8/918; 8/924;
260/153; 260/174; 544/204
[58] Field of Search .................. 8/549, 681, 687, 688,
8/437; 260/153, 174; 544/180, 204

[56] References Cited

U.S. PATENT DOCUMENTS 3,758,470  9/1973  Ackermann et al. .................. 8/549

FOREIGN PATENT DOCUMENTS

| 2921309 | 12/1979 | Fed. Rep. of Germany . |
| 869279 | 5/1961 | United Kingdom . |
| 1333248 | 10/1973 | United Kingdom . |
| 1536706 | 12/1978 | United Kingdom . |
| 2007247 | 5/1979 | United Kingdom . |
| 1549820 | 8/1979 | United Kingdom . |
| 2023158 | 12/1979 | United Kingdom . |

*Primary Examiner*—A. Lionel Clingman
*Attorney, Agent, or Firm*—Gerald D. Sharkin; Richard E. Vila; Melvyn M. Kassenoff

[57] ABSTRACT

Compounds of the formula

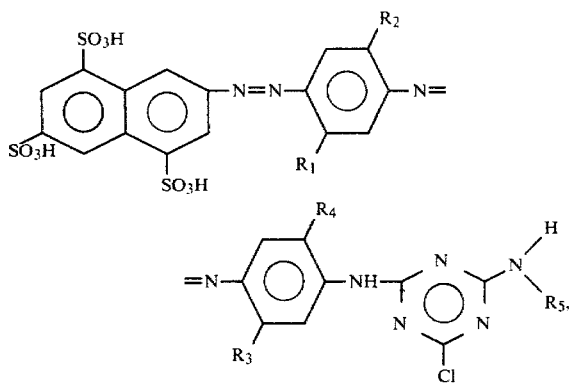

in which
each of $R_1$ and $R_3$, independently, is hydrogen, methyl, methoxy or —$NHCOR_6$,
each of $R_2$ and $R_4$, independently, is hydrogen, methyl or methoxy, with the proviso that at least one of $R_1$ to $R_4$ is hydrogen,
$R_5$ is hydrogen, 2-, 3- or 4-hydroxy-$C_{2-4}$alkyl, carboxy-$C_{1-4}$alkyl, sulpho-$C_{1-4}$alkyl, sulphophenyl or carboxyphenyl and
$R_6$ is methyl or $NH_2$, salts thereof, and mixtures of such compounds which compounds and mixtures are useful as reactive dyes for nitrogen-containing and hydroxy group-containing organic substrates such as leather and textile materials comprising or consisting of natural or synthetic polyamides such as wool, silk and nylon and natural or regenerated cellulose such as cotton, viscose and spun rayon.

20 Claims, No Drawings

DISAZO COMPOUNDS HAVING A 4,6,8-TRISULFONAPHTHYL DIAZO COMPONENTS RADICAL AND A 2-AMINO OR SUBSTITUTED AMINO-4-CHLORO-1,3,5-TRIAZIN-6-YL-AMINO SUBSTITUENT

The present invention relates to chloro-triazinyl-containing compounds, their production and use as fibre reactive dyes.

More particularly, the present invention provides compounds of formula I,

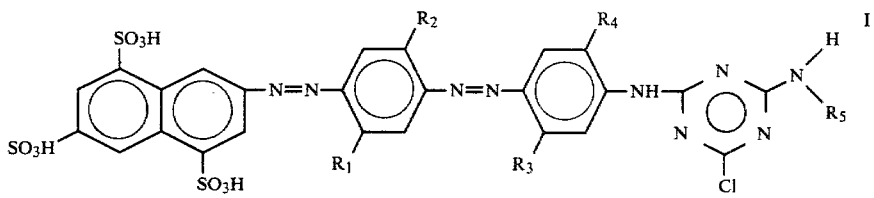

in which
each of $R_1$ and $R_3$, independently, is hydrogen, methyl, methoxy or —NHCOR$_6$,
each of $R_2$ and $R_4$, independently, is hydrogen, methyl or methoxy, with the proviso that at least one of $R_1$ to $R_4$ is hydrogen,
$R_5$ is hydrogen, 2-, 3- or 4-hydroxy-$C_{2-4}$alkyl, carboxy-$C_{1-4}$alkyl, sulpho-$C_{1-4}$alkyl, sulphophenyl or carboxyphenyl and
$R_6$ is methyl or NH$_2$, salts thereof
and mixtures of such compounds.

Preferably $R_1$ is $R_1'$, where $R_1'$ is hydrogen, methyl, —NHCOCH$_3$ or —NHCONH$_2$, with hydrogen being most preferred.

$R_2$ is preferably $R_2'$, where $R_2'$ is hydrogen or methoxy, with hydrogen being especially preferred.

$R_3$ is preferably $R_3'$, where $R_3'$ has one of the significances of $R_1'$ as give above; most preferably $R_3$ is hydrogen.

$R_4$ is preferably $R_4'$, where $R_4'$ is hydrogen or methoxy, with hydrogen being most preferred.

Preferably, at least three of $R_1$ to $R_4$ signify hydrogen; more preferably, each of $R_1$ to $R_4$ signifies hydrogen.

Any hydroxyalkyl as $R_5$ is preferably 2-hydroxyethyl or 2- or 3-hydroxypropyl, with hydroxyethyl being especially preferred.

An alkyl in the carboxyalkyl or sulphoalkyl as $R_5$ preferably contains 1 to 3 carbon atoms, more preferably 1 or 2 carbon atoms.

$R_5$ is preferably $R_5'$, where $R_5'$ is hydrogen, 2-hydroxyethyl, 2- or 3-hydroxypropyl, sulpho- or carboxy-$C_{1-2}$alkyl, sulphophenyl or carboxyphenyl. More preferably $R_5$ is $R_5''$, where $R_5''$ is hydrogen, 2-hydroxyethyl, sulpho-$C_{1-2}$alkyl or 3- or 4-sulphophenyl. More preferably $R_5$ is $R_5'''$, where $R_5'''$ is hydrogen, 2-hydroxyethyl or 3- or 4-sulphophenyl.

Preferred compounds of formula I are
(1) those in which $R_1$ is $R_1'$, $R_2$ is $R_2'$, $R_3$ is $R_3'$ and $R_4$ is $R_4'$;
(2) those of (1) where at least two of $R_1$ to $R_4$ signify hydrogen;
(3) those in which $R_5$ is $R_5'$;
(4) those of (1) or (2) in which $R_5$ is $R_5''$;
(5) those of formula Ia

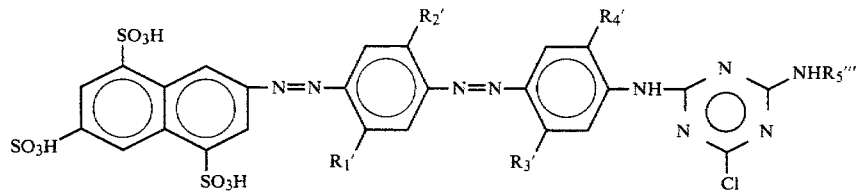

and salts thereof;
(6) those of (5) where at least 3 of $R_1'$ to $R_4'$ signify hydrogen; and
(7) those of (1) to (6) in which each of $R_1$ to $R_4$ is hydrogen.

When the compounds of formula I are in salt form, the cations of the sulpho groups and any carboxy group present is not critical and may be any of those non-chromophoric anions conventional in the chemistry of fibre reactive dyes. Examples of such cations are lithium, sodium, potassium and ammonium. The preferred cations are alkali metal, with sodium being especially preferred.

The present invention also provides a process for the preparation of compounds of formula I, as defined above, comprising
condensing a compound of formula II,

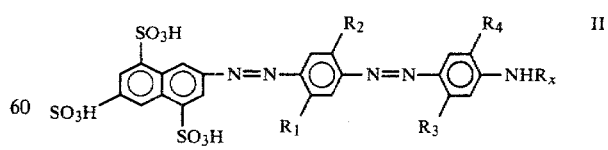

or a salt thereof or a mixture of such compounds, with a compound of formula III $$R_yNHR_5 \qquad III$$

wherein either $R_x$ is a radical of formula (a)

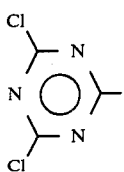

and $R_y$ is hydrogen, or $R_x$ is hydrogen and $R_y$ is a radical of formula (a).

The condensation reaction is effected in accordance with known methods, suitably at temperatures between room temperature and 65° C. in the presence of an acid binding agent such as sodium carbonate, sodium hydroxide, sodium bicarbonate or triethylamine.

The preferred process is one wherein a compound of formula II wherein $R_x$ is a radical of formula (a) is reacted with a compound of formula III wherein $R_y$ is hydrogen.

The compounds of formulae II and III wherein $R_x$ and $R_y$ are hydrogen are either known or may be prepared by known methods from available starting materials. Similarly, the compounds of formulae II and III, wherein $R_x$ and $R_y$ signify a radical of formula (a), may be prepared by known methods, e.g. condensing a compound of formula II, resp. III wherein $R_x$ and $R_y$ signify hydrogen with cyanuric chloride. Owing to the ease with which the first chlorine atom is replaced, the temperature may be as low as from 0° to 5° C.

The compounds of formula I and mixtures thereof are useful as fibre reactive dyestuffs for dyeing and padding hydroxy group or nitrogen-containing organic substrates. Preferred substrates are leather and textile materials comprising or consisting of natural or synthetic polyamides such as wool, silk or nylon, and especially natural and regenerated cellulose such as cotton, viscose or spun rayon.

Dyeing and padding may be effected in conventional manner. The compounds are especially useful for exhaust dyeing in accordance with standard methods for fibre reactive dyestuffs, e.g. dyeing at temperatures of from 80° to 100° C.

The dyestuffs build up well and exhibit a high fixation yield. Further, non-fixed dyestuff is easily removed by washing. The dyeings obtained have good wet fastnesses, such as wash-, water- and sweat fastness, and notable light fastness as well as fastness to chlorine.

The following Examples furher serve to illustrate the invention. In the Examples all parts are by weight and the temperatures are in degrees Centigrade.

EXAMPLE 1

50 Parts aminoazo compound obtained by coupling diazotized 2-aminonaphthalene-4,6,8-trisulphonic acid with aniline-ω-methanesulphonic acid followed by splitting off the methanesulphonic acid group in alkaline medium are neutralized and dissolved in 400 parts water and then reacted with 7.5 parts sodium nitrite and cooled to 0°. By the addition of 50 parts 30% hydrochloric acid with vigorous stirring the pH of the reaction mixture is adjusted to make it acid to congo red. For the coupling, the diazonium suspension is added dropwise within two hours to a paste consisting of 22 parts sodium salt of aniline-ω-methanesulphonic acid and 3 parts sodium acetate in 50 parts water. The pH is kept at 4.5 to 5 by simultaneous addition of approximately 25 parts sodium hydrogen carbonate. The whole is stirred for 3 hours and the ω-methanesulphonic acid group is split off in alkaline medium by heating to 80° and simultaneously adding about 160 parts 30% sodium hydroxide so that the whole has a content of 6 to 10% sodium hydroxide. After saponification the mixture is neutralized with 30% hydrochloric acid and the aminodisazo compound is salted out with sodium chloride and filtered.

65 Parts of the thus obtained aminodisazo compound in the sodium salt form are dissolved in 800 parts water and the solution is allowed to run into a ice-cooled suspension of 20 parts cyanuric chloride in 50 parts water. With the slow addition of a concentrated solution of c. 7 parts sodium carbonate in water the pH is held in a range of from 5.0 to 7.0. After the condensation, 9 parts ethanolamine are added, the mixture is heated to 40° within 30 minutes and is held at a temperature of 40° for 2 hours with the addition of ca. 5 parts sodium carbonate to keep the pH at 7.5–8.0. After completion of the second condensation step the dyestuff is salted out with sodium chloride, filtered and dried in vacuo at 70° to 80°. The dyestuff which corresponds to the formula

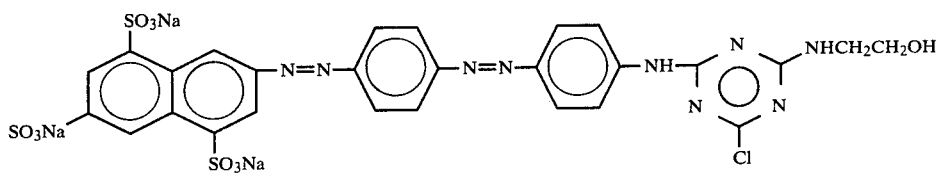

dyes cotton and fibres of regenerated cellulose in orange tones. The dyeings have good fastness properties.

The free acid form and other salt forms of the compound of this example may also be obtained.

In analogy with the procedure described in Example 1 further compounds of the following Table may be prepared. These compounds also, owing to the reaction and isolation conditions, are in the sodium salt form. The dye shade of cellulose fibre when dyed by the exhaust process is given in the Table whereby b=orange, c=brownish orange and d=reddish brown.

TABLE 1

| Ex. No. | $R_1$ | $R_2$ | $R_3$ | $R_4$ | $R_5$ | dye shade on cotton |
|---|---|---|---|---|---|---|
| 2 | H | H | H | H | H | b |
| 3 | CH$_3$ | OCH$_3$ | H | H | —CH$_2$CH$_2$SO$_3$Na | c |
| 4 | H | H | H | H | " | b |

TABLE 1-continued

| Ex. No. | R₁ | R₂ | R₃ | R₄ | R₅ | dye shade on cotton |
|---|---|---|---|---|---|---|
| 5 | CH₃ | OCH₃ | CH₃ | H | —⌬—SO₃Na | c |
| 6 | " | H | " | H | " | c |
| 7 | H | H | H | H | ⌬-SO₃Na | b |
| 8 | CH₃ | OCH₃ | H | H | " | c |
| 9 | —NHCOCH₃ | H | H | H | —⌬—SO₃Na | c |
| 10 | —NHCONH₂ | H | H | H | " | c |
| 11 | " | H | H | H | —CH₂CH₂OH | c |
| 12 | " | H | —NHCONH₂ | H | —⌬-SO₃Na | d |
| 13 | " | H | " | H | —CH₂CH₂SO₃Na | d |
| 14 | —NHCONH₂ | H | —NHCONH₂ | H | —CH₂SO₃Na | d |
| 15 | —NHCOCH₃ | H | H | H | —⌬-SO₃Na | c |
| 16 | —NHCONH₂ | H | —NHCONH₂ | H | —CH₂CH₂OH | d |
| 17 | H | H | H | H | —⌬—SO₃Na | b |
| 18 | H | H | H | OCH₃ | —⌬-SO₃Na | c |
| 19 | H | H | CH₃ | H | " | b |
| 20 | H | OCH₃ | H | H | " | c |
| 21 | CH₃ | H | H | H | " | b |
| 22 | OCH₃ | H | CH₃ | H | " | c |
| 23 | CH₃ | H | H | H | —⌬—SO₃Na | c |
| 24 | CH₃ | OCH₃ | CH₃ | H | " | c |
| 25 | H | OCH₃ | CH₃ | H | —CH₂CH₂SO₃Na | c |
| 26 | H | H | H | H | —CH₂SO₃Na | b |

APPLICATION EXAMPLE

1 Part of the dye of Example 1 is dissolved in 300 parts of water. 30 parts of cotton are added to the dyebath and the temperature is raised to 80° in 10 minutes. 15 Parts of Glauber's salt are added and then, after 30 minutes, 3 parts of sodium carbonate. Dyeing is continued at 80° for a further hour. The dyed material is rinsed cold and then hot. The dyeing is soaped at the boil for 20 minutes in 500 parts water containing 0.5 parts sodium alkylsulphonate. After rinsing an orange dyeing having good fastnesses is obtained.

The compounds of Examples 2 to 26 may also be employed for dyeing cotton according to this method.

What is claimed is:

1. A compound of the formula

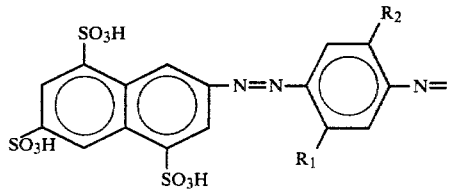

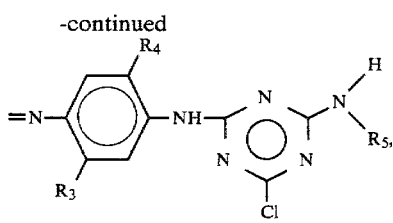

or a salt thereof each cation of which is non-chromophoric, wherein
each of $R_1$ and $R_3$ is independently hydrogen, methyl, methoxy or —NHCOR₆, wherein R₆ is methyl or amino,
each of $R_2$ and $R_4$ is independently hydrogen, methyl or methoxy, with the proviso that at least one of $R_1$–$R_4$ is hydrogen, and
$R_5$ is hydrogen, 2-, 3- or 4-hydroxy($C_{2-4}$alkyl), carboxy($C_{1-4}$alkyl), sulfo($C_{1-4}$alkyl), sulfophenyl or carboxyphenyl,
or a mixture of such compounds in free acid or salt form.

2. A compound according to claim 1, or a salt thereof each cation of which is non-chromophoric.

3. A compound according to claim 2, or a salt thereof each cation of which is lithium, sodium, potassium or ammonium.

4. A compound according to claim 2, or a salt thereof

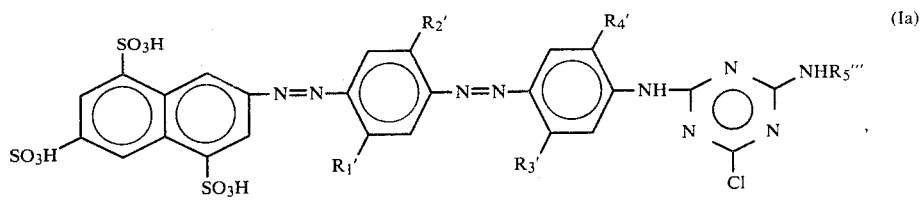

each cation of which is non-chromophoric, wherein $R_1$ is hydrogen, methyl, acetamido or ureido.

5. A compound according to claim 2, or a salt thereof each cation of which is non-chromophoric, wherein $R_2$ is hydrogen or methoxy.

6. A compound according to claim 2, or a salt thereof each cation of which is non-chromophoric, wherein $R_3$ is hydrogen, methyl, acetamido or ureido.

7. A compound according to claim 2, or a salt thereof each cation of which is non-chromophoric, wherein $R_4$ is hydrogen or methoxy.

8. A compound according to claim 2, or a salt thereof each cation of which is non-chromophoric, wherein at least three of $R_1$-$R_4$ are hydrogen.

9. A compound according to claim 8, or a salt thereof each cation of which is non-chromophoric, wherein $R_5$ is hydrogen, 2-hydroxyethyl, sulfo($C_{1-2}$alkyl) or 3- or 4-sulfophenyl.

12. A compound according to claim 11 having the formula or a salt thereof each cation of which is non-chromophoric, wherein
$R_1'$ is hydrogen, methyl, acetamido or ureido,
$R_2'$ is hydrogen or methoxy,
$R_3'$ is hydrogen, methyl, acetamido or ureido,
$R_4'$ is hydrogen or methoxy, and
$R_5'''$ is hydrogen, 2-hydroxyethyl or 3- or 4-sulfophenyl.

13. A compound according to claim 12, or a salt thereof each cation of which is non-chromophoric, wherein at least three of $R_1'$-$C_4'$ are hydrogen.

14. A compound according to claim 13, or a salt thereof each cation of which is non-chromophoric, wherein each of $R_1'$-$R_4'$ is hydrogen.

15. The compound according to claim 14 having the formula

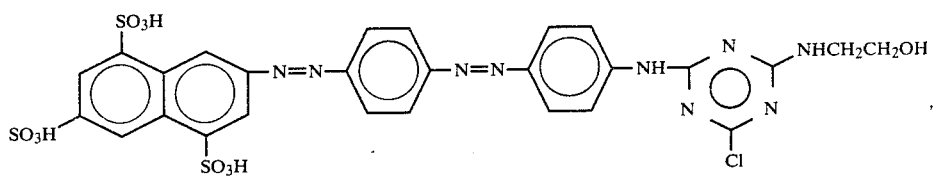

each of $R_1$-$R_4$ is hydrogen.

10. A compound according to claim 2, or a salt thereof each cation of which is non-chromophoric, wherein or a salt thereof each cation of which is non-chromophoric.

16. The salt according to claim 15 having the formula

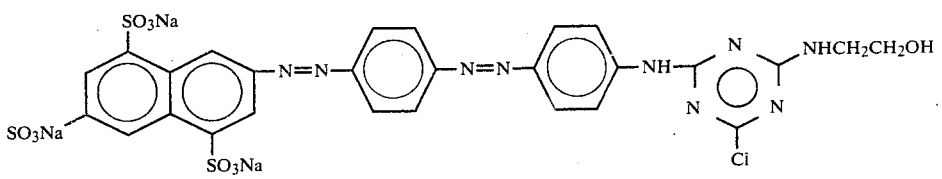

$R_5$ is hydrogen, 2-hydroxyethyl, 2- or 3-hydroxypropyl, sulfo($C_{1-2}$alkyl), carboxy($C_{1-2}$alkyl), sulfophenyl or carboxyphenyl.

11. A compound according to claim 10, or a salt thereof each cation of which is non-chromophoric, wherein 17. The compound according to claim 14 having the formula

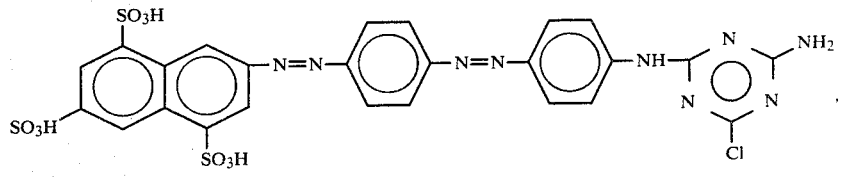

or a salt thereof each cation of which is non-chromophoric.

18. A process for dyeing a nitrogen-containing or hydroxy group-containing organic substrate comprising applying to a nitrogen-containing or hydroxy group-containing organic substrate a compound according to claim 1, a salt thereof each cation of which is non-chromophoric, or a mixture of such compounds in free acid or salt form.

19. A process according to claim 13, in which the substrate is leather or a textile material consisting of or comprising a natural or synthetic polyamide or natural or regenerated cellulose.

20. A process according to claim 19 wherein the substrate consists of or comprises cotton, viscose or spun rayon.

* * * * *